(12) United States Patent
Scott

(10) Patent No.: US 8,347,074 B2
(45) Date of Patent: Jan. 1, 2013

(54) SYSTEM AND METHOD FOR BEND-IN-THE-WIRE ADJACENCY MANAGEMENT

(75) Inventor: James Patrick Scott, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 710 days.

(21) Appl. No.: 12/365,776

(22) Filed: Feb. 4, 2009

(65) Prior Publication Data

US 2009/0327699 A1    Dec. 31, 2009

Related U.S. Application Data

(60) Provisional application No. 61/077,053, filed on Jun. 30, 2008.

(51) Int. Cl.
*H04L 29/06* (2006.01)
(52) U.S. Cl. .................. 713/153; 709/238; 709/228
(58) Field of Classification Search .................. 713/153
See application file for complete search history.

(56) References Cited

U.S. PATENT DOCUMENTS

| 6,976,071 B1* | 12/2005 | Donzis et al. ................. 709/224 |
| 7,366,784 B2* | 4/2008 | Ishizaki ........................ 709/228 |
| 7,373,660 B1* | 5/2008 | Guichard et al. ............... 726/15 |
| 7,401,160 B2* | 7/2008 | Johnson et al. ............... 709/238 |
| 2009/0228708 A1* | 9/2009 | Trostle .......................... 713/171 |
| 2010/0014459 A1* | 1/2010 | Mir et al. ...................... 370/328 |

* cited by examiner

*Primary Examiner* — Kambiz Zand
*Assistant Examiner* — Dant Shaifer Harriman
(74) *Attorney, Agent, or Firm* — Caven & Aghevli LLC

(57) ABSTRACT

A method for translating network data transmissions begins with a data transmission received at a router. An interface identifier is prepended before a first field of the data transmission, forming a prepended field. The data transmission is transmitted to a translation device. The data transmission is translated without altering the prepended field. The translated data transmission is transferred back to the router. The interface identifier is removed. The translated data is transmitted while maintaining adjacency with an adjacent peer using the interface identifier.

12 Claims, 6 Drawing Sheets

SYSTEM AND METHOD FOR BEND-IN-THE-WIRE ADJACENCY MANAGEMENT

CROSS REFERENCE TO RELATED APPLICATION

This application claims priority from U.S. Provisional Application Ser. No. 61/077,053, filed Jun. 30, 2008.

STATEMENT REGARDING FEDERALLY SPONSORED RESEARCH OR DEVELOPMENT

This disclosure was made in part with Government support under contract number FA8808-04-C-0022 awarded by the Air Force. The Government may have certain rights in the invention.

FIELD

The present disclosure is generally related to network communications and, more particularly, is related to a method and apparatus for bend-in-the-wire adjacency management.

BACKGROUND

One of the limitations of the original Internet Protocol (IP) is that it lacks any sort of general-purpose mechanism for ensuring the authenticity and privacy of data as it is passed over the Internet, or any other network. Since IP data usually must be routed between two devices over unknown networks, any information in them is subject to being intercepted and even possibly changed. With the increased use of the Internet for critical applications, security enhancements were needed for IP. To this end, a set of protocols called IP Security or IPsec was developed.

IPsec provides security to IP, which is the basis for all other Transmission Control Protocols (TCP)/IP protocols. In protecting IP, substantially TCP/IP is protected as well. There are several implementation methods for deploying IPsec. These represent different ways that IPsec may modify the overall layer architecture of TCP/IP.

Putting IPsec into all host devices provides the most flexibility and security. It enables end-to-end security between any two devices on the network. However, there are many hosts on a typical network, so this means far more work than just implementing IPsec in routers.

Implementing IPsec in the router is more efficient from an operational perspective, as there are typically far fewer routers than clients in a network. Router implementation provides protection only between routers and associated peers that implement IPsec, but this may be sufficient for certain applications such as VPNs.

Three different architectures provide methods for how to get IPsec into the TCP/IP protocol stack: integrated, bump in the stack (BITS) and bump in the wire.

Integrating IPsec protocols and capabilities directly into IP itself is an elegant solution (by simply combining BITS with the bump in the network layer). It allows all IPsec security modes and capabilities to be provided just as easily as regular IP. No extra hardware or architectural layers are needed. IPv6 was designed to support IPsec. Thus, it is a viable option for hosts or routers. However, with IPv4, integration would require making changes to the IP implementation on each device, which is impractical.

FIG. 1 is an illustration of a typical bump-in-the-stack (BITS) architecture. A typical BITS networking protocol stack 10 may include a network interface 12, a driver 14, an Internet Protocol layer 16, a transport layer 18, and an applications layer 20. In the bump-in-the-stack (BITS) technique, IPsec 22 is made a separate architectural layer between the driver 14 and the network interface 12. The name refers to the fact that IPsec 22 layer bumps the other layers in the BITS networking protocol stack 10. IPsec 22 intercepts incoming IP data as it is passed down the BITS networking protocol stack 10, provides security, and passes them to the network interface 12. An advantage of this technique is that IPsec 22 can be retrofitted to any IP device, since the IPsec 22 functionality is separate from the Internet Protocol layer 16. The main disadvantage of the BITS approach is associated with throughput performance, as BITS implies a centralized router architecture. Higher performance distributed router architectures require either distributed hardware-based service processing engines (IPsec is just one example service) or use of a centralized hardware-based service processor enhanced by the Bend-in-the-Wire disclosure described herein. The BITS networking protocol stack 10 is generally used for IPv4 hosts, but can be used for IPv6 and is used by hosts as well as low-end routers. Also, while the IPsec 22 layer is shown between the driver 14 and the network interface 12, it may acceptably placed in other locations within the stack, as is known to those having ordinary skill in the art.

FIG. 2 is an illustration of a typical bump-in-the-wire (BITW) architecture. In the bump-in-the-wire (BITW) system 110, an IPsec hardware device 122 is added to provide IPsec services. For example, a company may have two sites. Each site has a network that connects to the Internet protocol router 128 using a router 130 that is not capable of IPsec functions. A special IPsec hardware device 122 can be interposed between the router 130 and the Internet protocol router 128 at both sites. These IPsec hardware devices 122 will intercept outgoing data transmissions, add IPsec protection to them, and strip it off incoming data transmissions. It should be noted that each peer router 130 may be used for an individual computer or other communications device or it could be used for a network 132 of computers and/or communications devices.

Just as BITS allows one to add IPsec to legacy hosts, BITW can retrofit non-IPsec routers to provide security benefits. The disadvantages are the complexity and cost of employing a separate service processor at each physical interface of the router. Even though BITS and BITW seem quite different, they actually do the same thing. In the case of BITS, an extra software layer adds security to existing IP data transmissions; in BITW, distinct hardware devices do this same job. In both cases, the result is the same. The problem with BITS is that the process is SWaP (Size, Weight, and Power) efficient, but does not allow a high throughput. The problem with BITW is that it provides a high throughput, but is not SWaP efficient.

SUMMARY

Embodiments of the present disclosure provide a system and method for translating network data transmissions. One embodiment of the system, among others, can be implemented as follows. The system contains a plurality of adjacent routers. A primary router is in communication with each of the adjacent routers. A translation device communicates with only the primary router.

The present disclosure can also be viewed as providing methods for isomorphically (i.e. such that information is preserved) translating network data transmissions. In this regard, one embodiment of such a method, among others, can be broadly summarized by the following steps: receiving a data transmission at a router; prepending an interface identifier before a first field of the data transmission, thereby forming a prepended field; transmitting the data transmission to a translation device; translating the data transmission without altering the prepended field; transferring the translated data transmission back to the router; removing the prepended interface identifier; and maintaining an adjacency state for an adjacent peer using the interface identifier.

In another embodiment, a computer readable medium is provided having computer readable program code disposed therein for translating network data transmissions. The computer readable program code includes a series of computer readable program steps for: receiving a data transmission at a router; prepending an interface identifier before a first field of the data transmission, forming a prepended field; transmitting the data transmission to a translation device; translating the data transmission without altering the prepended field; transferring the translated data transmission back to the router; removing the interface identifier; and maintaining an adjacency state for an adjacent peer using the interface identifier.

Other systems, methods, features, and advantages of the present disclosure will be or become apparent to one with skill in the art upon examination of the following drawings and detailed description. The features, functions, and advantages that have been discussed can be achieved independently in various embodiments of the present disclosure or may be combined in yet other embodiments further details of which can be seen with reference to the following description and drawings.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
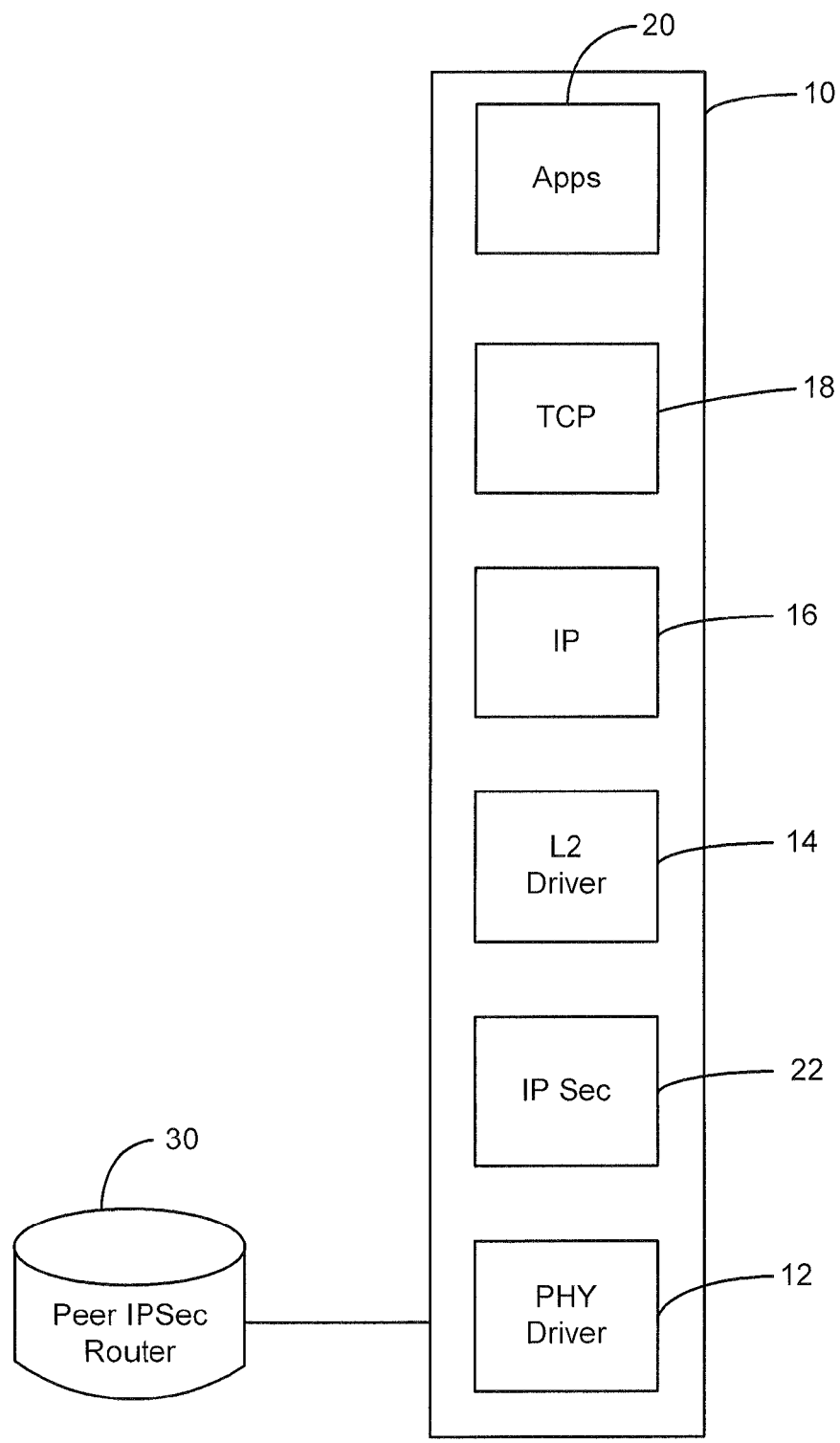
FIG. 1 is an illustration of a bump-in-the-stack (BITS) architecture.
Figure 2:
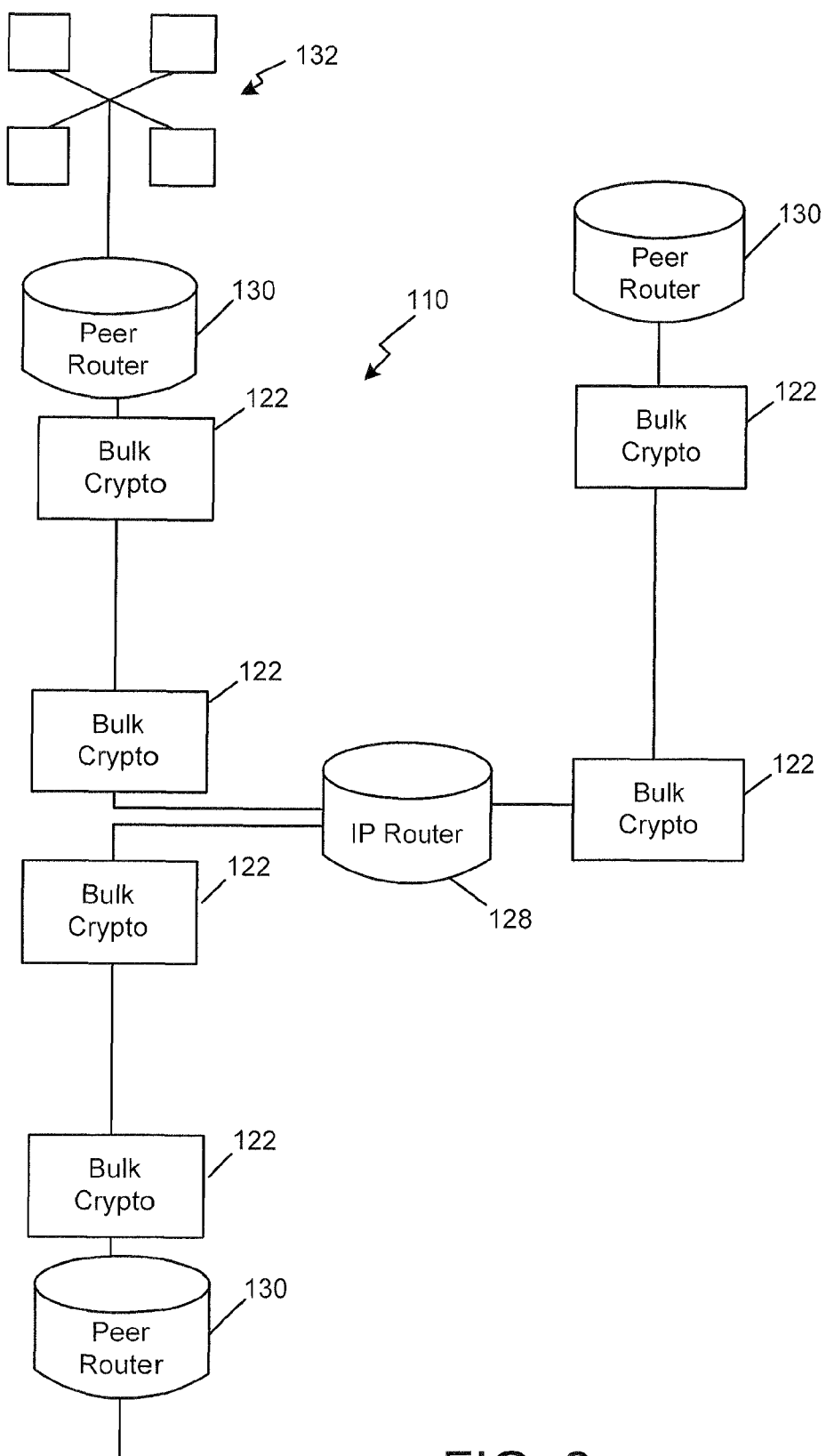
FIG. 2 is an illustration of a bump-in-the-wire (BTTW) architecture.
Figure 3:
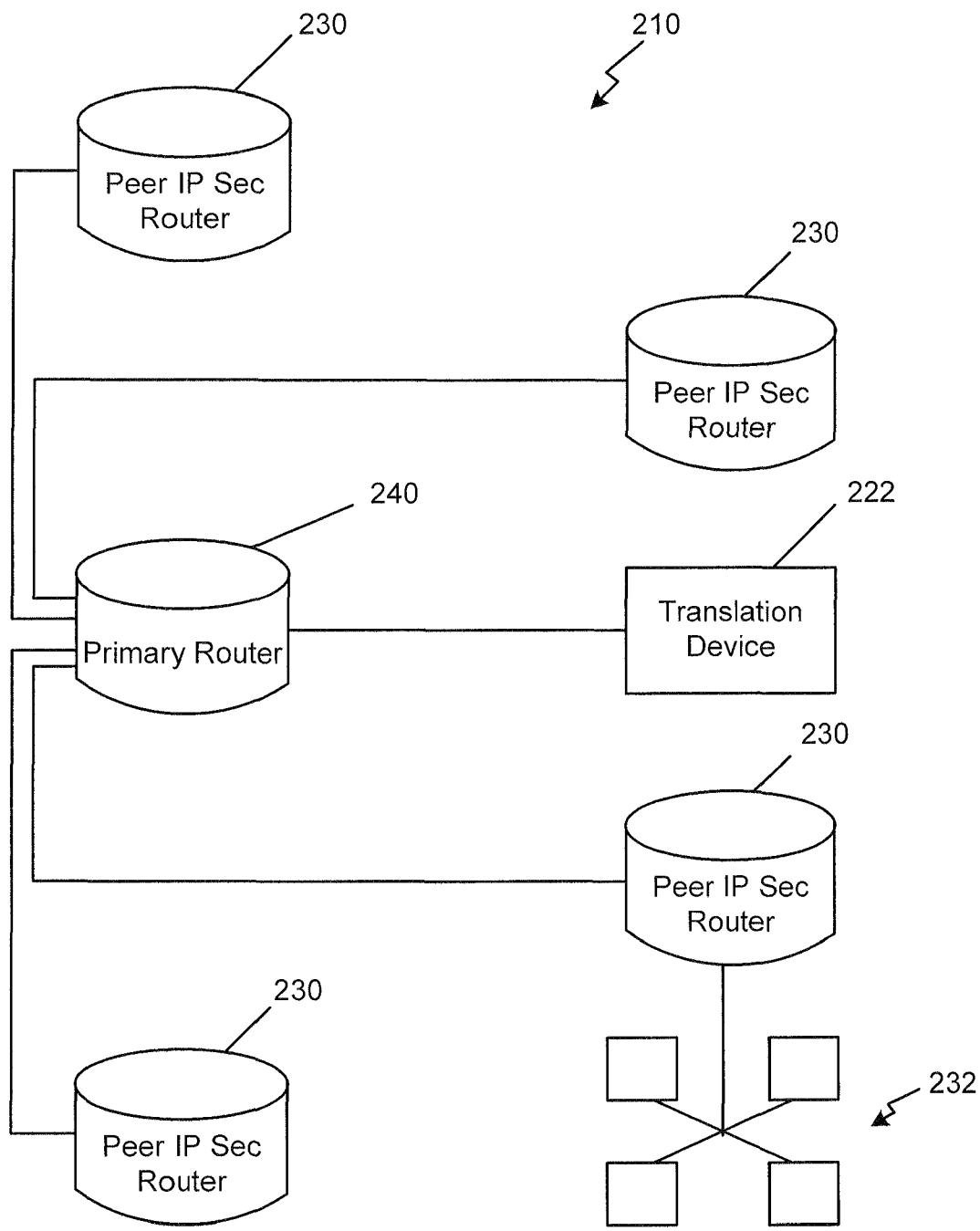
FIG. 3 is an illustration of a bend-in-the-wire system, in accordance with an exemplary embodiment of the present disclosure.

FIG. 3 is an illustration of bend-in-the-wire system, in accordance with an exemplary embodiment of the present disclosure. The bend-in-the-wire system 21 0 contains a plurality of adjacent routers 230. A primary router 240 is in communication with each of the adjacent routers 230. A translation device 222 communicates with only the primary router 240. The adjacent routers 230 may serve individual computers or communications devices or may serve a network 232 of computers and/or communications devices.

The translation device 222 may be a cryptographic device. The translation device 222 may be a compression device. The translation device 222 may be any type of device that changes the size, shape, or appearance of any data transformation or otherwise provides for an isomorphic data transmission. 'Isomorphic' in this context refers to an information-preserving transformation.

The present disclosure may be implemented without requiring any hardware or software modifications to the peer routers 230. The primary router 240 is programmed to prepend an interface identifier before a first field of an incoming data transmission. The interface identifier allows the primary router 240 to maintain routing data for the data transmission that might otherwise be lost by the translation device 222 translating the data transmission, The translation device 222 may be programmed to disregard the interface identifier in a prepended field, before the first field, thus not impinging the integrity of the interface identifier, which will be used to complete the routing of the data transmission. The translation device 222 may be programmed to recognize the prepended field, but otherwise to avoid altering the prepended field, thus not impinging the integrity of the interface identifier, which will be used to complete the routing of the data transmission. Those having ordinary skill in the art will recognize there may be various ways to program the translation device 222 to effectively translate the data transmission without impinging the integrity of the interface identifier, all of which are considered to be within the scope of the present disclosure.

Figure 4:
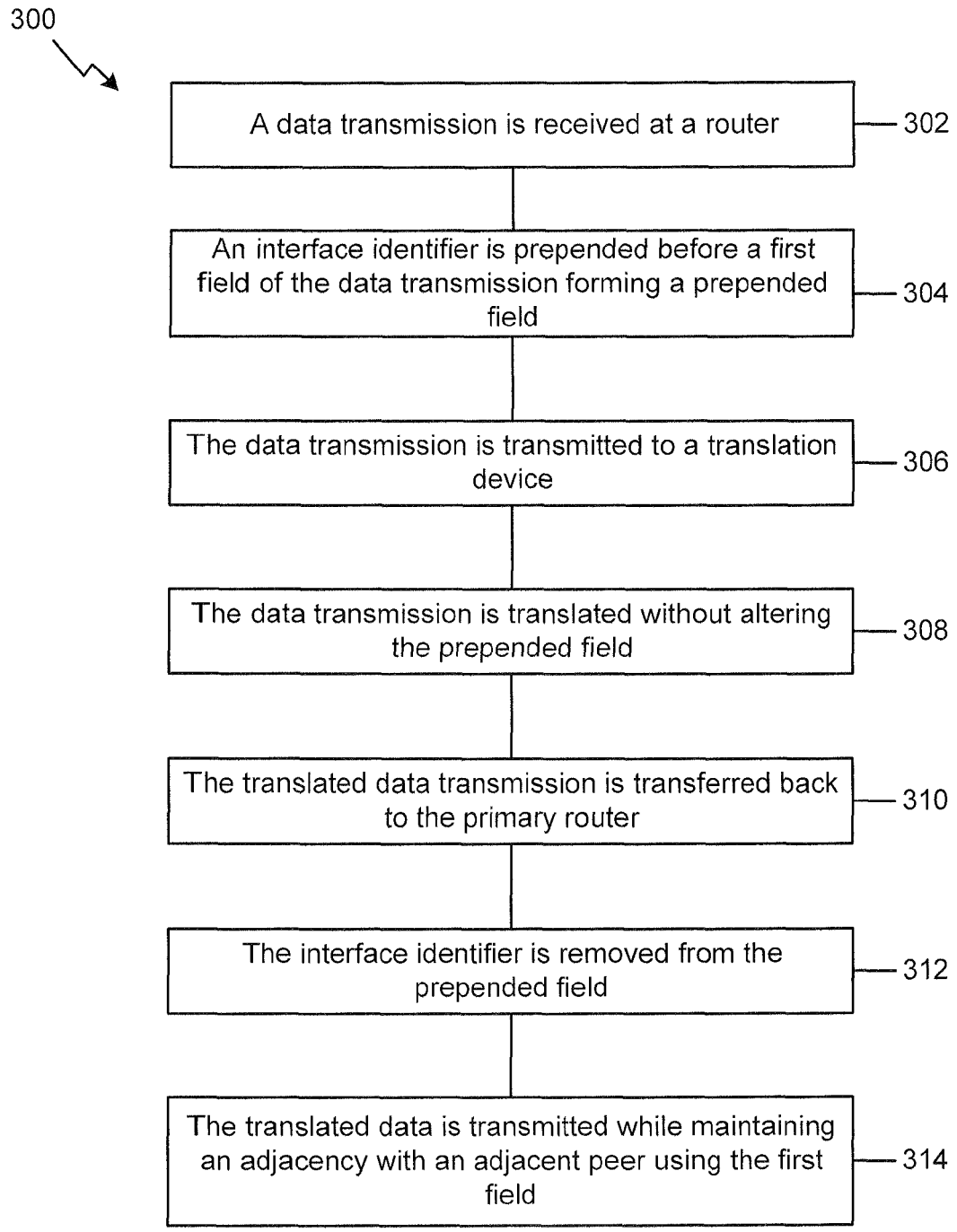
FIG. 4 is a flowchart illustrating a method for translating network data transmissions, in accordance with an exemplary embodiment of the disclosure.

FIG. 4 is a flowchart 300 illustrating a method for translating network data transmissions, in accordance with the first exemplary embodiment. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art. For example, the step of prepending an interface identifier to a data transmission in block 304 may be executed before the step of receiving a data transmission at block 302, and so forth.

As is shown by block 302, a data transmission is received at a router 240. An interface identifier is prepended before a first field of the data transmission forming a prepended field (block 304). The data transmission is transmitted to a translation device 222 (block 306). The data transmission is translated without altering the prepended field (block 308). The process of translating may include encrypting the data transmission. The translated data transmission is transferred back to the primary router 240 (block 310). The interface identifier is removed from the prepended field (block 312). The translated data is transmitted while maintaining an adjacency state, for example a link-state adjacency, with an adjacent peer 230 using the first field (block 314).

Bend-in-the-wire applies generically to adjacency management for both distance vector and link-state protocols. The scope of the adjacent peer 230 may include one or more signaling peers. Minor changes to the adjacency management code may be required to use the inserted interface ID rather than the identifier found in the forwarding table.

Figure 5:
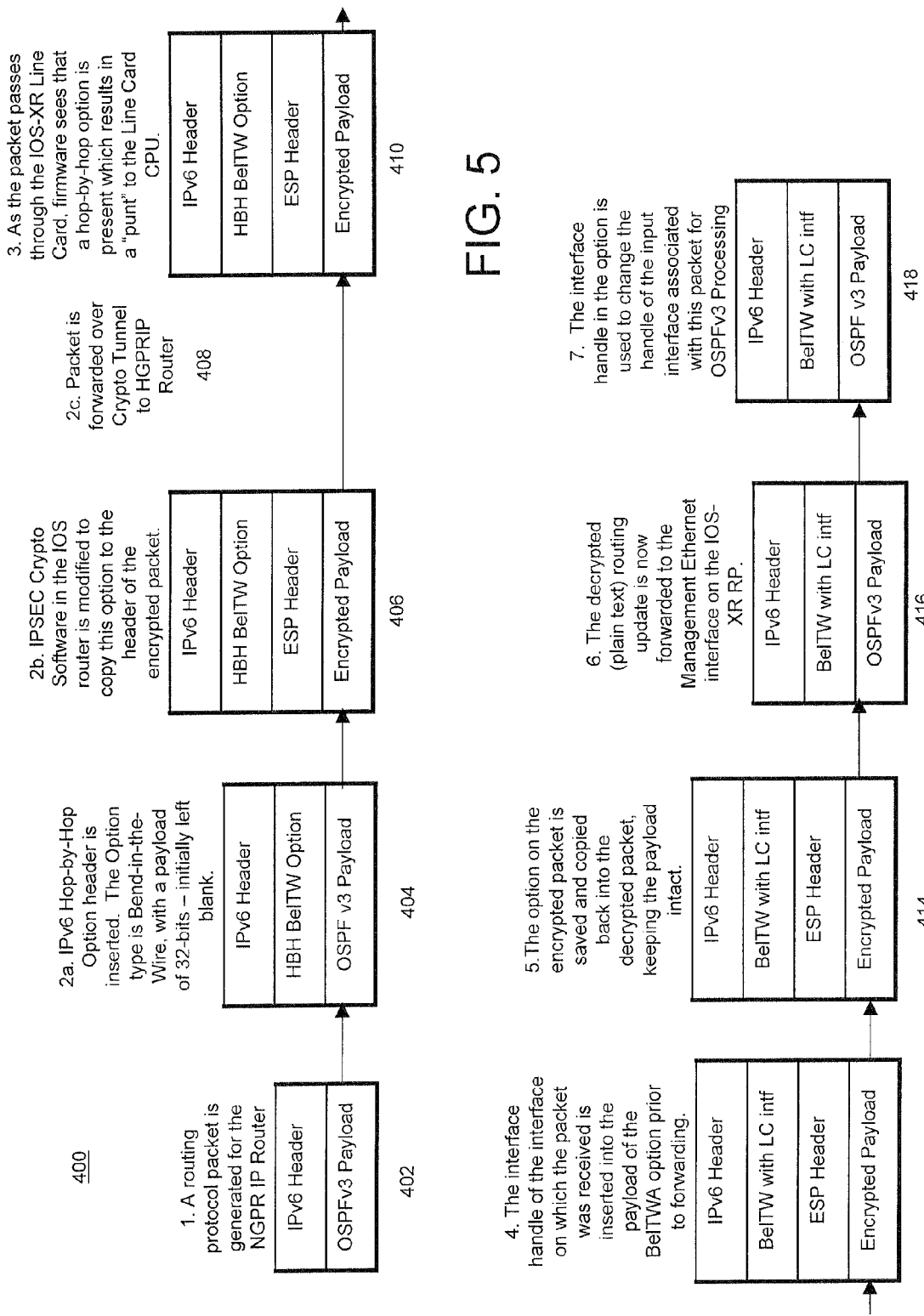
FIG. 5 is a flow chart illustrating a method for translating network data transmissions, in accordance with another exemplary embodiment of the disclosure.
Figure 6:
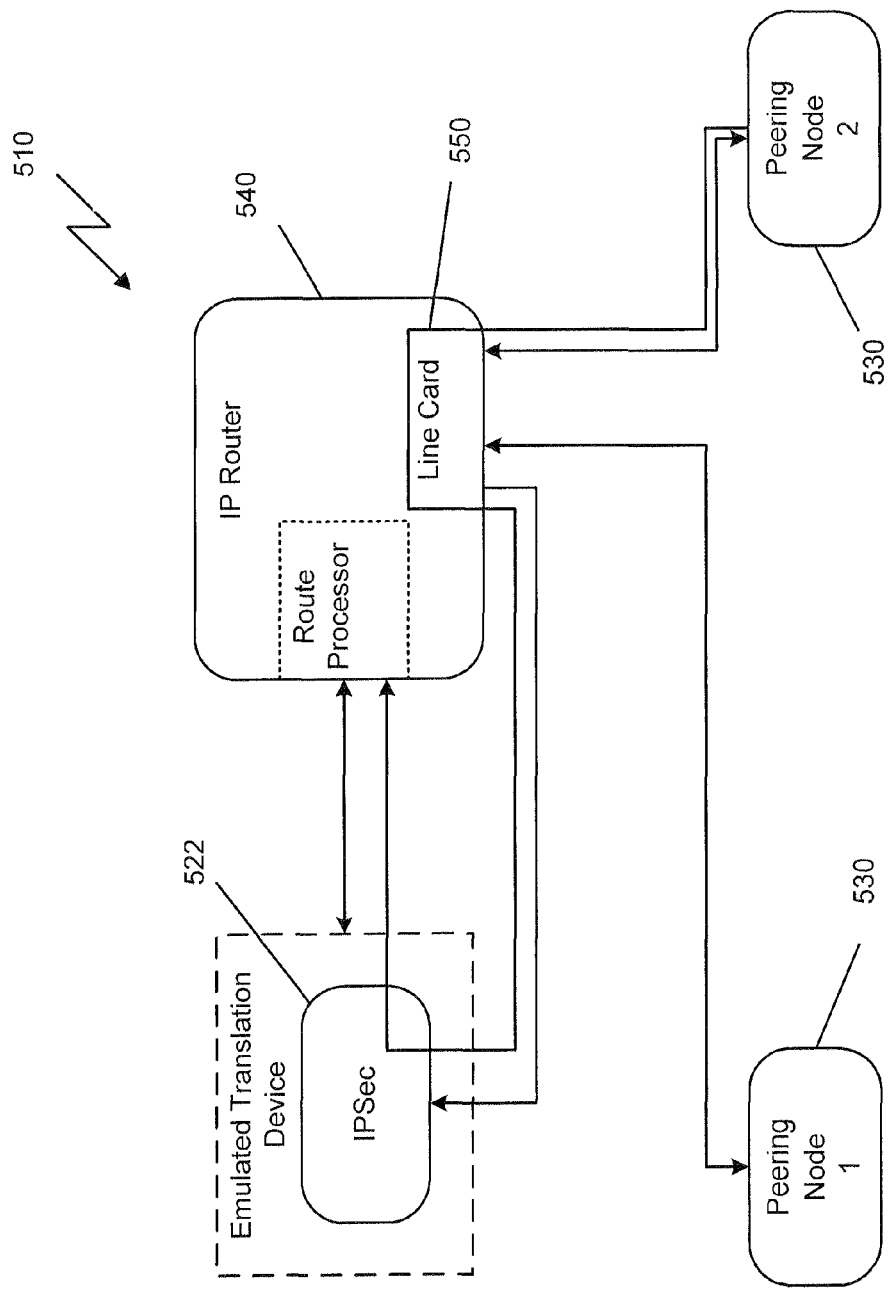
FIG. 6 is an illustration of bend-in-the-wire system, in accordance with another exemplary embodiment of the present disclosure.

Alternately, rather than prepending the interface identifier over which the arriving traffic was received before the first field of the packet header, the ingress interface identifier may be encoded into a proprietary IP options field. FIG. 5 is a flow chart 400 illustrating this method for translating network data transmissions, in accordance with another exemplary embodiment of the disclosure, It should be noted that in this embodiment, the proprietary IP options field is used only for internal processing and is not included in any form of the packet transmitted onto an external interface. FIG. 6 is an illustration of bend-in-the-wire architecture 510, in accordance with another exemplary embodiment of the present disclosure. Describing the method of FIG. 5 with respect to the system of FIG. 6, as shown in block 402, a routing protocol packet is generated for the IP router 540. An option header, with a payload of 32 bits, is inserted and initially left blank (block 404). Cryptographic software in the adjacent router 530 is modified, copying the encryption software payload option to a header of the encryption packet (block 406). The packet is forwarded to the IP router 540 (block 408). As the packet passes through the line card 550, firmware sees the option header and forwards the packet to the line card CPU (block 410). The interface handle of the line card interface is inserted into the payload of the previously blank option header (block 412). The encryption software payload option is saved by the IPsec device 522 and copied back into a decrypted packet, keeping the payload intact (block 414). The decrypted routing update is now forwarded to the Ethernet interface on the IP router 540 (block 416). The interface handle in the payload of the option header is used to charge the handle of the input interface associated with this packet for Open Shortest Path First v3 (OSPFv3) processing (block 418).

The technical effects achieved by the present disclosure may enable bump-in-the-wire throughput performance and scalability while using limited, or even a single, (hence SWaP-efficient) translation functions. The present disclosure may enable a high-throughput, scalable solution that decouples the service translation from the router without disrupting traditional router adjacency management, overcoming some of the aforementioned limitations presented by bump-in-the-wire and bump-in-the-stack systems.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims.

What is claimed is:

1. A system for translating network data transmissions, the system comprising:
   a plurality of adjacent routers;
   a primary router in communication with each of the adjacent routers, wherein the primary router is configured to:
      receive a data transmission;
      prepend an interface identifier before a first field of the data transmission; and
      transmit the data transmission and the interface identifier; and
   a translation device in communication with only the primary router, wherein the translation device is configured to:
      receive the data transmission and the interface identifier from the primary router;
      translate the data transmission without altering the interface identifier; and
      transmit the translated data transmission and the interface identifier back to the primary router;
   wherein the primary router is further configured to:
      receive the translated data transmission and the interface identifier from the translation device;
      remove the prepended interface identifier;
      transmit the translated data transmission while maintaining a link-state adjacency with an adjacent router.

2. The system of claim 1, wherein the translation device further comprises a cryptographic device.

3. The system of claim 1, wherein the translation device is programmed to disregard the prepended field.

4. The system of claim 1, wherein the translation device is programmed to avoid altering the prepended field.

5. A method for translating network data transmissions, comprising:
   receiving a data transmission at a primary router;
   prepending, in the primary router, an interface identifier before a first field of the data transmission to form a prepended field;
   transmitting the data transmission and the interface identifier from the primary router to a translation device communicatively coupled only to the primary router;
   translating, in the translation device, the data transmission without altering the interface identifier in the prepended field;
   transferring the translated data transmission and the interface identifier from the translation device back to the primary router;
   removing, in the primary router, the prepended interface identifier; and
   transmitting the translated data transmission from the primary router while maintaining an adjacency state with an adjacent peer router using the interface identifier.

6. The method of claim 5, wherein prepending the interface identifier precedes receiving the data transmission.

7. The method of claim 5, wherein translating further comprises encrypting the data transmission.

8. A non-transitory computer readable medium having computer readable program code disposed therein for translating network data transmissions, the non-transitory computer readable program code comprising a series of computer readable program steps for:
   receiving a data transmission at a primary router;
   prepending, in the primary router, an interface identifier before a first field of the data transmission, forming a prepended field;
   transmitting the data transmission and the interface identifier from the primary router to a translation device communicatively coupled only to the primary router;
   receiving, in the primary router, a translated data transmission and the interface identifer;
   removing the interface identifier; and
   transmitting the translated data transmission from the primary router while maintaining an adjacency state with an adjacent peer router using the interface identifier.

9. The non-transitory computer readable medium of claim 8, wherein the step of prepending interface identifier precedes the step of receiving the data transmission.

10. The non-transitory computer readable medium of claim 8, wherein the step of translating further comprises encrypting the data transmission.

11. The non-transitory computer readable medium of claim 8, wherein the step of translating disregards the prepended field.

12. The non-transitory computer readable medium of claim 8, wherein the step of translating avoids altering the prepended field.

* * * * *